United States Patent [19]

deSilva et al.

[11] Patent Number: 4,574,071
[45] Date of Patent: Mar. 4, 1986

[54] PROCESS FOR REMOVING DISSOLVED OXYGEN FROM WATER USING HYDRAZINE

[75] Inventors: Sunil G. DeSilva, Wilkins Township, Allegheny County; Charles W. Hearp, Trafford, both of Pa.

[73] Assignee: Westinghouse Electric Corp., Pittsburgh, Pa.

[21] Appl. No.: 678,380

[22] Filed: Dec. 5, 1984

Related U.S. Application Data

[63] Continuation of Ser. No. 537,924, Sep. 30, 1983, abandoned.

[51] Int. Cl.$^4$ .............................................. C23F 11/08
[52] U.S. Cl. ...................................... 422/14; 210/696; 210/750; 210/757; 252/188.28; 422/9; 423/580
[58] Field of Search ............... 210/738, 750, 757, 696; 252/188.28; 422/14, 211, 224, 9; 423/580, 584

[56] References Cited

U.S. PATENT DOCUMENTS

| | | | |
|---|---|---|---|
| 3,437,427 | 4/1969 | Quesada | 423/580 |
| 3,595,626 | 7/1971 | Sowards | 422/211 |
| 3,764,548 | 10/1973 | Redmore | 210/750 |
| 3,808,138 | 4/1974 | Yamaguchi | 210/750 |
| 3,962,113 | 6/1976 | Schiessel | 210/750 |
| 4,079,018 | 3/1978 | Noack | 252/188.28 |
| 4,124,500 | 11/1978 | Arghiropoulos | 252/188.28 |
| 4,159,309 | 6/1979 | Faul | 210/757 |
| 4,234,317 | 11/1980 | Lucas | 210/738 |
| 4,287,072 | 9/1981 | Beecher | 210/757 |

OTHER PUBLICATIONS

Perry's Chemical Engineers' Handbook, McGraw Hill, New York, 1969, 4–11 and 4–12.
Martinola, "Saving Energy by Catalytic Reduction of Oxygen in Feedwater", F. Martinola, International Water Conference, Pittsburgh, Pa., Oct. 20, 21, 22, 1980.

*Primary Examiner*—Ernest G. Therkorn
*Attorney, Agent, or Firm*—Daniel C. Abeles

[57] ABSTRACT

A process for removing dissolved oxygen from an aqueous medium, using hydrazine to react with the oxygen, where the aqueous medium is contacted with a catalyst bed of palladium or platinum metal dispersed on a solid carrier, at ambient temperatures. The catalyst bed effects reaction of the hydrazine with the dissolved oxygen to provide residual oxygen contents of below 10 ppb. Preferably, the hydrazine is intimately mixed with the aqueous medium prior to contact with the catalyst bed. The process is especially useful in removing dissolved oxygen from recirculating aqueous medium of a steam generation system, where the hydrazine-containing aqueous medium is contact with the catalyst bed after passage through the condenser pump but prior to the feedwater heaters.

8 Claims, No Drawings

PROCESS FOR REMOVING DISSOLVED OXYGEN FROM WATER USING HYDRAZINE

This is a continuation of application Ser. No. 537,924 filed Sept. 30, 1983, now abandoned.

FIELD OF THE INVENTION

The present process relates to a process for removing dissolved oxygen from water by the use of hydrazine, and is especially directed to the removal of dissolved oxygen from the feed water of a steam generation system.

BACKGROUND OF THE INVENTION

In various systems which recirculate an aqueous medium, such as boiler systems for energy production, the recirculated water picks up unwanted oxygen which becomes dissolved in the water. The presence of the dissolved oxygen can be involved in a variety of corrosion problems within the secondary system of a power plant, such as pitting, denting of steam generator tubes, stress corrosion cracking and feedtrain degradation. In the predominant process for dissolved oxygen removal, in a secondary system of a power plant, hydrazine is added at the condensate pump. Even though oxygen ingress can occur in any section of the feedtrain from the condenser to the steam generator, such hydrazine addition is only effective at temperature, conditions which prevail after the feedwater heaters. This is due to the kinetics for the oxygen-hydrazine reaction being more favorable at high temperatures.

Current dissolved-oxygen control practices in power plant systems are limited for various reasons. One reason is the relatively short contact time available for hydrazine to react with oxygen in the high temperature region of the feedtrain where this reaction is most efficient. In the low temperature end of the feedtrain, the region immediately following the condenser and up to the feedwater heaters, little oxygen removal occurs because of low temperatures that prevail at that region. Another complication with the current hydrazine addition processes is that, in plants having copper alloy feedtrain components, there is competition between the copper surfaces and hydrazine for the dissolved oxygen. The reaction of copper and oxygen leads to the formation of nonvolatile surrogates of oxygen which may be transported into the steam generator or can be active in steam generator corrosion processes. Due to the large surface areas of copper alloys in the feedtrain, they can react more readily with oxygen than the available hydrazine due to limited contact time.

Problems involved with the presence of dissolved oxygen in water and various methods for removal of such oxygen, both physical and chemical, are discussed in the paper, "Saving Energy by Catalytic Reduction of Oxygen in Feedwater", by F. Martinola, presented at the 41st Annual Meeting International Water Conference, at Pittsburgh, Pa. on Oct. 20-22, 1980, the contents of said paper being incorporated by reference herein. The Martinola paper discusses the use of a palladium containing polystyrene-based anion exchange resin to aid in the reaction of hydrogen, added to an aqueous medium, with dissolved oxygen in the aqueous medium. In a system described therein, hydrogen is added to water, containing 8 ppm oxygen, which is passed through a mixing tank containing plexiglass rings, and the mixture then flows to a reactor which contains a palladium catalyst. The residual oxygen content of the water after passage through the catalyst column was 0.025 ppm (25 ppb). Other systems using hydrogen and the palladium catalyst gave residual oxygen contents of between about 0.015 ppm to 0.025 ppm (15-25 ppb).

It is an object of the present invention to provide an improved process for removing dissolved oxygen from water using hydrazine, which process can be operated at ambient temmperatures.

It is another object of the present invention to provide a process for removal of dissolved oxygen from an aqueous media that will provide a residual oxygen content of less than 10 parts per billion (ppb) in the aqueous media.

It is a further object of the present invention to provide a process for the removal of dissolved oxygen from the feedtrain of a power plant system before recirculated water is passed through the feedtrain heaters into the steam generator, thereby reducing copper component degradation and transport.

SUMMARY OF THE INVENTION

Dissolved oxygen is removed from an aqueous medium wherein hydrazine has been added to react with the oxygen, by passing the hydrazine-containing aqueous medium over a physically stable carrier support containing metallic palladium or platinum. The metallic palladium or platinum catalyzes the reaction between the hydrazine and the dissolved oxygen such that removal of the oxygen may be effected at ambient temperatures. Preferably, the palladium- or platinum-containing catalyst bed is formed from a palladium- or platinum-containing, polystyrene-based anion exchange resin, and the hydrazine-containing aqueous media is passed through a mixing means, such as a column filled with glass beads, to provide intimate contact of the hydrazine and the dissolved oxygen prior to contact with the catalyst bed. The hydrazine-containing aqueous medium is also preferably pressurized to about 50-150 pounds per square inch, upon entering the catalyst bed, to provide good contact and flow through the bed. After contact of the hydrazine-containing aqueous medium for a period of time sufficient to reduce the dissolved oxygen content of the water to below about 10 parts per billion, by weight, the water is discharged from the catalyst bed for use.

In a specific embodiment of the invention, dissolved oxygen is removed from the recirculated aqueous media of a steam generation system, with the aqueous medium, containing hydrazine, contacted with the palladium or platinum catalyst bed after the condenser pump and prior to the feedwater temperatures and prior to heating of the aqueous medium and return to the steam generator.

DETAILED DESCRIPTION

The present invention provides an improved process for the removal of dissolved oxygen from power plant water feedtrains, where the hydrazine that is added to the water is reacted with the dissolved oxygen in the presence of a palladium or platinum catalyst and at ambient temperatures.

In a secondary system of a power plant, water is continuously being circulated. The water is passed through feedwater heating systems, then through the steam generator, back to a condenser where fluids are condensed, and then through a condenser pump for recycle to the system through the feedwater heaters. In such conventional systems where hydrazine is added to the aqueous media to react with, and remove, dissolved oxygen that is picked up throughout the system, the hydrazine is normally added after the condensate pump and prior to the preheaters. The primary reactions of the hydrazine with the dissolved oxygen occur, however, after preheating of the aqueous medium.

In the present process, contact of the hydrazine-containing water is effected with a palladium or platinum catalyst before the recycled water is passed to the feedwater heater system.

In steam generation plants, the dissolved oxygen content of the water will normally be below a maximum of about 100 parts per billion, by weight, with lower values normally found. With the present process, the oxygen content can be lowered to below 10 parts per billion, and even below 2 parts per billion. The amount of hydrazine added, on a molar basis, as in conventional processes, should be that required to react with the dissolved oxygen present in the aqueous medium. A 1:1 hydrazine/oxygen molar ratio is preferred, although a slight excess of hydrazine is usable.

The hydrazine-containing aqueous media is contacted with the catalyst bed comprising a noble metal, selected from palladium and platinum, disposed on a solid carrier medium. The solid carrier should be water-insoluble, physically stable under the conditions of the process, and provide a support for finely dispersed palladium or platinum metal. Useful as such a solid carrier is a polystyrene based ion exchange resin, and especially a polystyrene-based anion exchange resin. Examples of commericially available such palladium-containing, polystyrene-based anion exchange resins are Lewatit OC 1045 and Lewatit OC 1040 sold by Mobay Chemical Corporation.

The palladium or platinum catalyst is preferably retained in a column and the hydrazine-containing water passed through the column under pressure. The contact is effected at ambient temperatures, i.e. between about 20°–40° C., which temperatures are far below normal hydrazine-oxygen reaction temperatures used in conventional dissolved oxygen removal systems.

The time of contact of the hydrazine-containing water and the palladium or platinum catalyst is that sufficient to effect reaction of the hydrazine and the dissolved oxygen and may vary depending upon the initial oxygen content of the aqueous media, amount of hydrazine added, amount of palladium or platinum present on the carrier, and other factors. Contact times of between about 0.5–2 minutes are sufficient. The contact is, however, of time sufficient to remove oxygen to a degree which provides a residual oxygen content in the water of less than about 10 parts per billion by weight, and preferably less than 2 part per billion by weight.

That contact of the hydrazine-containing water and palladium or platinum catalyst is carried out under a positive pressure of between about 50–150 pounds per square inch guage, with a pressure of about 100 pounds per square inch gauge being preferred. In order to achieve the inlet pressures of about 100 psig to the catalyst column, a pump is inserted into the feed line to the column.

In another embodiment of the invention, intimate mixing of the hydrazine and aqueous medium is carried out prior to passage thereof to the catalyst column. Such intimate mixing can be achieved by passing the mixture through a tube or column containing glass beads, or the like, which provides a tortuous flow through the tube and mixing of the hydrazine and aqueous medium.

The present process is especially useful in removing oxygen from the aqueous media of a secondary system of a steam generation plant. In such plants, an aqueous media is passed through feedwater heaters and then to a steam generator. From the steam generator, the aqueous media is condensed, and the condensate then pumped by means of a condensate pump back to the feedwater heaters and recycled through the system. In conventional systems, while hydrazine may be added to the aqueous medium prior to the feedwater heaters, the actual reaction between the hydrazine and dissolved oxygen in the aqueous medium does not occur until the aqueous medium has been heated in the feedwater heaters, or subsequently. In the present invention, the catalyst bed, containing a palladium or platinum metal, is interposed in the system between the condensate pump and the feedwater heaters, such that removal of the dissolved oxygen from the recirculated aqueous medium is effected at ambient temperatures and prior to contact thereof with the feedwater heaters.

The invention is further illustrated by reference to the following examples, wherein parts are parts by weight, unless otherwise indicated. In these examples, the dissolved oxygen content was determined with the use of an Orbisphere 2713 model digital dissolved oxygen analyzer having an accuracy of plus or minus one part per billion.

EXAMPLE I

A flow of water which contained an inlet oxygen content of 1.5 parts per million (ppm) oxygen was passed through a column containing a bed of catalyst, 500 ml of Lewatit OC 1045, a palladium-containing, polystyrene-based anionic resin. The flow rate of the water was 1000 ml/min. To this stream, hydrazine was added from a make-up tank containing 27.15 ppm of hydrazine in water, at an injection rate of 17 ml/min. This provided 2.3 ppm of hydrazine in the process flow entering the catalyst column. The initial pressure applied to the water flow was 15 psig, the pressure at introduction to the column increased to 100 psig, by use of a variable speed pump, and the pressure of the water leaving the catalyst column was 40 psig. The temperature of the hydrazine-containing water entering the column was 23.8° C. while the temperature at the exit was 24.3° C. The initial oxygen content of the water leaving the column was about 1.7 ppm. After 20 minutes flow through the column, the oxygen content at the inlet was 1 ppm, while the oxygen content of the water leaving the column had decreased to 0.0075 ppm (7.5 ppb).

EXAMPLE II

The procedure of Example I was repeated except that a flow rate of 500 ml/min. was used, with the pressures being 15 psig at the initial flow; 65 psig at introduction to the column; and 15 psig at the exit of the column. The temperature of the hydrazine-containing water entering the column was 24.2° C. while the temperature at the exit was 24.7° C. The initial oxygen content of water leaving the column was 0.89 ppm. After 10 minutes flow, the oxygen content of the inlet water was 1 ppm, while the oxygen content of the water leaving the column had decreased to 0.0034 ppm (3.4 ppb).

EXAMPLE III

A further example was run following the procedure of Example II, with the variable speed pump removed from the system. The pressures in the system were: 15 psig at initial flow; 50 psig at introduction to the column; and 4 psig at the exit from the column. The hydrazine content of the flow of water was adjusted to 0.230 ppm, and the temperature of the hydrazine-containing water entering the column was 24.1° C. while the temperature at the exit of the column was 24.5° C. The oxygen content of the inlet water was 0.131 ppm, and the initial oxygen content of water leaving the column was 0.91 ppm. After 6 minutes flow, the oxygen content of the inlet water was 0.093 ppm while the oxygen content of the water leaving the column had decreased to 0.0035 ppm (3.5 ppb).

EXAMPLE IV

A series of runs were made using a palladium catalyst as described in Example I, using 1 liter of resin, contained in a 2 inch diameter column, and a flow rate of water of 1000 ml/min. The water, after addition of hydrazine, was first passed through a 9 inch long stainless steel, one inch interior diameter, pipe packed with 3 mm diameter glass beads, so as to effect intimate mixing of the hydrazine and water prior to content with the catalyst. The flow was effected by a variable speed gear pump to pressurize and mix the process flow downstream of the hydrazine addition point. The pressures were: 18 psig at the initial flow; 100 psig at introduction to the column; and 20 psig at the exit of the catalyst column. The temperature of the water entering the column was between 24°–25.5° C. and the temperature of the water at the outlet of the column was between 24.2°–26 C. The hydrazine concentrations of the flow to the catalyst column, inlet oxygen content of the water, and outlet oxygen content of the water (from the catalyst column), at various times were recorded and are listed in the following table.

| Run | Time | Hydrazine conc. (ppm) | Inlet Oxygen (ppm) | Outlet Oxygen (ppm) |
|---|---|---|---|---|
| 1 | 0 | 16.6 | 4 | 4.2 |
|   | 30 | " | 4 | 0.009 |
|   | 60 | " | 4 | 0.005 |
| 2 | 0 | 46.2 | 4 | 3.76 |
|   | 60 | " | 5.4 | 0.009 |
|   | 69 | " | 4.3 | 0.005 |
| 3 | 0 | 46.2 | 3.6 | 3.9 |
|   | 60 | " | 3.7 | 0.002 |
| 4[a] | 0 | 0.46 | 0.147 | 0.045 |
|   | 50 | " | 0.2 | 0.0025 |

[a] 16 psig at the initial flow: catalyst bed was partially saturated with hydrazine prior to commencing the run.

The present invention provides an improved process for removal of dissolved oxygen from an aqueous medium using hydrazine and a catalyst bed. In power plant systems, the catalyst bed is interposed between a condensate pump and the feedwater heaters. This would significantly minimize feedtrain degradation since oxygen would be scavenged at the low temperature end of the feedtrain prior to the feedwater heaters. Since oxygen is scavenged before the feedwater heaters, no competition will exist between the reaction of hydrazine with oxygen and oxygen with copper present in the feedwater heater components. Thus, the amount of hydrazine consumed would be low and decomposition of hydrazine at higher temperatures avoided. In addition, copper oxide formation is prevented and possible transport of such oxides to the steam generator precluded.

What is claimed is:

1. In a process for the removal of dissolved oxygen from the aqueous media circulated in a steam generation system having copper alloy feedtrain components, including in series a feedwater heating system, steam generator, condenser, and condenser pump operative to recycle aqueous medium to the system through the feedwater heaters, and wherein hydrazine is added to the aqueous media, prior to said feedwater heaters, to react with said dissolved oxygen, the improvement wherein:

the hydrazine-containing aqueous media, after passage through the condenser pump, is contacted with in a column of an effective amount of a noble metal, selected from the group consisting of palladium and platinum, dispersed on a stable carrier material for a period of time effective to react the hydrazine with the dissolved oxygen at a temperature of between about 20°–40° C. and at a pressure of between about 50-150 psig, to reduce the dissolved oxygen content of the aqueous media to a value of less than 10 parts per billion, prior to passage of the aqueous medium to the feedwater heaters so as to reduce formation of oxides of copper which could be transported to and cause corrosion of the steam generator.

2. The process as defined in claim 1 wherein said noble metal is platinum.

3. The process as defined in Claim 1 wherein said dissolved oxygen content is reduced to about 2 parts per billion.

4. The process as defined in claim 1 wherein said noble metal is palladium.

5. The process as defined in claim 4 wherein said palladium is dispersed on a polystyrene-based anion exchange resin.

6. The process as defined in claim 1 wherein said contact is effected at a temperature between 20°–40° C. and at a pressure of about 100 psig.

7. The process as defined in claim 1 wherein, prior to contact with said noble metal, said aqueous medium containing the hydrazine is intimately mixed.

8. The process as defined in claim 7 wherein said aqueous medium containing the hydrazine is intimately mixed by passing the same through a column containing glass beads.

* * * * *